United States Patent
Reynolds

[11] 3,888,289
[45] June 10, 1975

[54] PREASSEMBLED FASTENER UNIT
[75] Inventor: Richard Lee Reynolds, Carpentersville, Ill.
[73] Assignee: Illinois Tool Works Inc., Chicago, Ill.
[22] Filed: May 17, 1974
[21] Appl. No.: 471,091

Related U.S. Application Data
[62] Division of Ser. No. 334,512, Feb. 21, 1973, abandoned.

[52] U.S. Cl. ..................... 151/38; 10/155 A; 85/46
[51] Int. Cl.² ..................... F16B 33/02; F16B 39/24
[58] Field of Search ........ 151/35, 36, 38, 69; 85/46, 85/48; 10/10 R, 155 A, 155 R

[56]  References Cited
UNITED STATES PATENTS

| | | | |
|---|---|---|---|
| 2,769,606 | 11/1956 | Larson | 151/38 |
| 2,829,696 | 4/1958 | Wagner | 151/69 |
| 3,037,221 | 6/1952 | Lanius | 10/10 R |
| 3,135,308 | 6/1964 | Tauscher | 10/10 R |
| 3,628,584 | 12/1971 | Gutshall | 151/38 |
| 3,661,046 | 5/1972 | Waud et al. | 85/46 |

Primary Examiner—Marion Parsons, Jr.
Attorney, Agent, or Firm—Robert W. Beart; Thomas W. Buckman

[57] ABSTRACT

A preassembled washer and threaded fastener of a headed screw type and method of forming and assembling the same; with pre-formed threads on the screw shank extending a limited axial distance from the screw head and along which the apertured washer is preassembled, and thereafter with secondary thread formation on substantially the remainder of the screw shank to provide threads of a crest diameter slightly greater than that of the pre-formed threads to trap the included washer on the screw shank immediately below the head.

4 Claims, 5 Drawing Figures

PREASSEMBLED FASTENER UNIT

This is a division of application Ser. No. 334,512, filed Feb. 21, 1973, now abandoned.

In certain prior preassembled screw and washer assemblies, the apertured washer is first assembled with the screw shank at an unthreaded portion below the head and the shank is then provided with threads, as by thread rolling, with the thread crest at least at the upper extremity being of larger diameter than the washer aperture to retain the washer preassembled with the screw. With washers of the conical type and the clearance space required by laterally positioned thread rolling dies, it is impractical to form the threads to extend much beyond the plane of the outer diameter of the conical washer preassembled with the screw shank, thus leaving an unthreaded portion of the screw shank as the washer is compressed toward flattened condition upon tightening of the screw into the workpiece. Particularly with thin workpieces, this may result in insufficient thread holding power with no further threads available for engagement with the workpiece. To overcome this lack of thread utility near the screw head when the washer is trapped, it has been proposed to preassemble a flat washer with the screw shank beneath the head and then form the thread up to the washer thickness. This results in an axial extension of the thread to adjacency with the head but requires a further operation to then deform the preassembled flat washer into a conical shape for holding power in the tightened fastener assembly. Another proposal contemplates initially forming the screw threads to close adjacency with the screw head and then assembly of a conical washer over the threads. This required a washer aperture larger than the preformed threads to enable the washer to be positioned adjacent the head, and then a further operation to reshape the washer so that the aperture would be reduced in size for the threads to trap the same as a preassembled unit.

This invention relates to a preassembled washer and threaded fastener assembly with the washer trapped in adjacency to the fastener head by thread formations on the fastener shank, and to a method of forming and assembling such a composite fastener unit.

An object of the invention is to provide a fastener assembly of the above type employing a substantially standard conical spring washer requiring no deformation thereof for assembly and trapped association with the threaded shank of the fastener.

Another object of the invention is to provide a preassembled washer and threaded fastener of the above type presenting utility thread formations on the fastener shank extending to the under face of the washer for work engagement as the washer is stressed toward flattened condition upon tightening of the fastener in the work.

A further object of the invention is to provide a fastener of the above type wherein the fastener shank is provided with thread formations of predetermined crest diameter beneath the fastener head over which the washer is preassembled and trapped by thread formations of larger crest diameter over substantially the remainder of the fastener shank.

The invention still further aims to provide a method of forming and assembling a fastener unit of the above type wherein the threads of predetermined small crest diameter are initially formed on the fastener shank to receive the washer and wherein the threads of larger crest diameter are then formed on the fastener shank to trap the washer in preassembly therewith.

The above and other objects of the invention will, in part, be obvious and will be hereinafter more fully pointed out in the detail description of the accompanying drawing in which.

Figure 1:
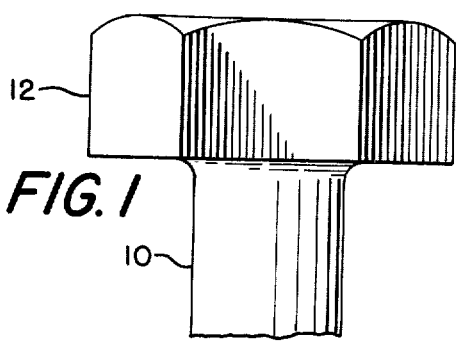
FIG. 1 is a fragmentary side elevation of the headed fastener prior to thread forming the shank.
Figure 2:
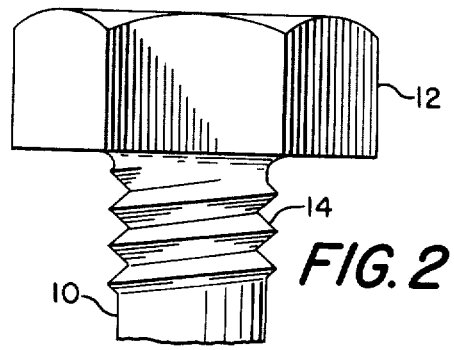
FIG. 2 is a similar side elevation showing initial formation of threads beneath the head.

With reference to the accompanying drawing, the fastener blank is shown in FIG. 1 as including an initially unthreaded shank 10 and a head 12 which may be of various tool receiving shapes but is here illustrated as hexagonal. In FIG. 2, the shank 10 has been processed to provide extruded helical threads 14 along a predetermined length of the shank 10 beneath the under surface of the head 12. These threads 14 may be conveniently pre-rolled by suitable thread rolling dies to have predetermined crest and root diameters and included flank angles to be referred to hereinafter.

Figure 3:
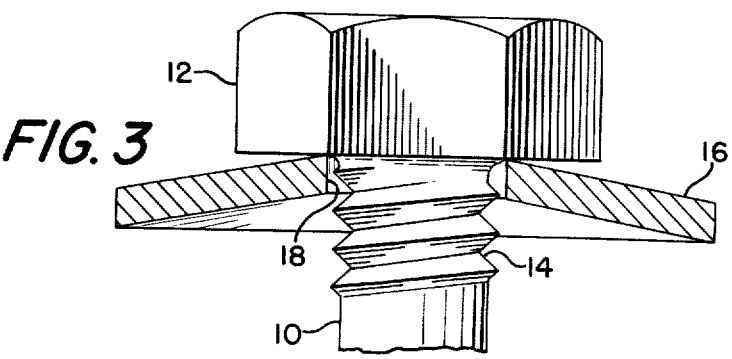
FIG. 3 is a similar side elevation showing a conical washer in section positioned on the initially threaded shank portion.

In FIG. 3, a substantially standard conical washer 16 is assembled with the fastener and for this purpose is provided with a central opening 18 of a diameter to clear the apices of the crests of the threads 14 and permit passage of the washer therealong to a preassembled position immediately beneath the under surface of the fastener head 12. In this position of the composite assembly, the remainder of the shank 10 is subjected to a secondary thread rolling step to form threads 20 with crest diameters slightly greater than the crest diameters of the threads 14, and also slightly greater than the diameter of the washer opening 18. Accordingly, with this secondary thread formation 20, the washer 16 is trapped in assembly with the threaded fastener shank as a preassembled washer and threaded fastener without requiring any deformation of the standard conical washer except where a slightly enlarged washer opening may be required for clearance over the crest diameter of the initial thread formation 14.

Figure 4:
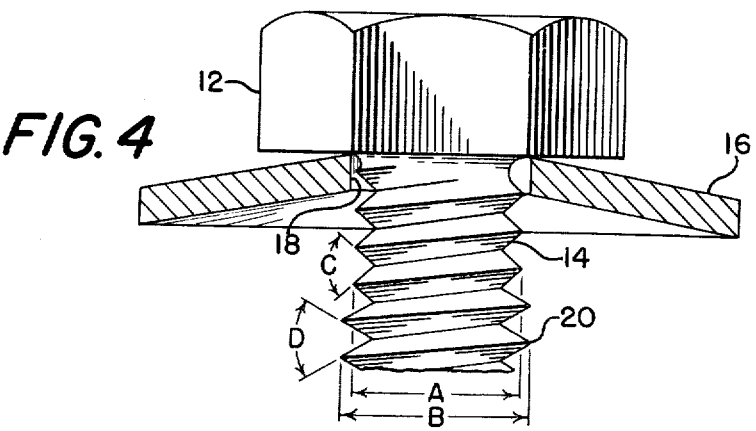
FIG. 4 is a similar side elevation showing the secondary thread formation on the shank with larger thread crest diameter to trap the washer in preassembly with the fastener.
Figure 5:
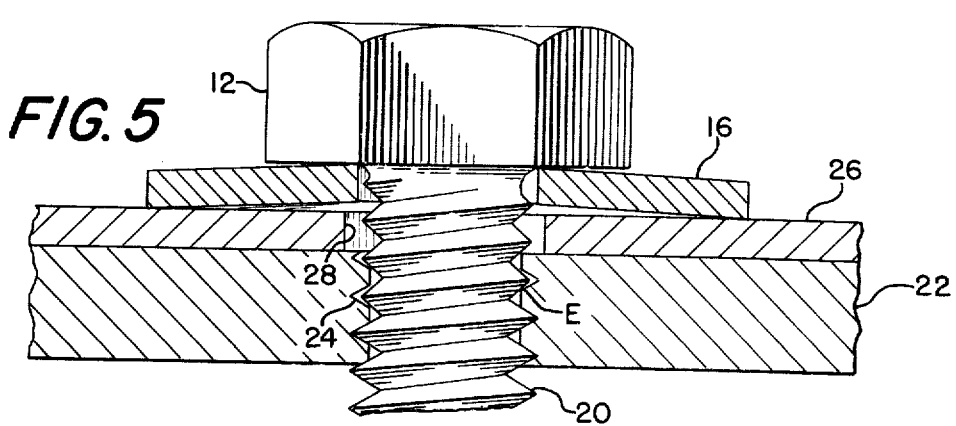
FIG. 5 is a side view showing the threaded fastener and washer assembly tightened into a typical workpiece assembly shown in section.

The preassembled fastener unit of FIG. 4 may be used in a variety of installations and the headed screw may be of the slotted thread cutting type or of the type to engage previously forward threads in a workpiece. One such installation is shown in FIG. 5 where the lower workpiece 22 is provided with preformed internal threads 24 for full thread interengagement with the threads 20. In this form of installation, there is an upper and thinner workpiece 26 having a preformed oversize aperture 28 through which the shank threads 20 may pass as they approach a position for engagement with the lower workpiece threads 24. Tightening of the shank threads 20 into the workpiece threads 24 will draw the fastener head 12 into engagement with the central portion of the washer 16 around the aperture 18 therein and cause flattening of the washer toward the stressed and locking position of FIG. 5 with the threads 20 in full thread engagement with the workpiece threads 24.

It is contemplated that the root diameter of the thread formations 20 will be generally the same, or closely approximating the root diameter of the thread formations 14. As shown in FIG. 4, the crest diameter A of the upper threads 14 is slightly less than the crest diameter B of the lower threads 20, with the thread crest diameter B providing interference with the washer 16 around the aperture 18 therethrough to prevent inadvertent separation of the washer and screw shank while permitting relative rotation therebetween. The reduced crest diameter A, whether it be an apical diameter or a flattened incomplete crest diameter, results in the thread formations 14 having a greater included flank angle C than the included flank angle D of the lower thread formations 20. Thus, the thread flanks of the upper threads 14 provide utility thread surfaces for some interfering engagement, as at E, with the preformed threads 24 in the workpiece 22 even though the crests of the thread formations 20 terminate therebelow but the thread rolling dies are selected to provide substantially uninterrupted thread mating at the transition between the upper and lower thread formations, or slight variation thereof, to maintain the interference engagement at E and thus provide a degree of prevailing torque cooperating with the flattened and stressed washer to resist inadvertent loosening under vibration and the like. Thus, while the threads 20 terminate below the plane of the outer edge of the conical washer, the threads 14 of lesser crest diameter extend substantially to the head 12 and provide utility thread formations extending to the plane of the washer at the central apertured portion thereof with at least one and a half, or more, pitch turns below the lower face of the washer when in stressed and substantially flattened installed condition.

I claim:

1. A preassembled composite fastener unit, for association with an apertured workpiece, comprising an apertured spring washer, and a screw type fastener having a shank extending through the washer aperture and a head presenting a clamping surface to the adjacent face of the washer; said shank having a first utility helical thread formation extending from adjacent the head clamping surface along a limited axial extent of the shank and of a predetermined crest diameter permitting free relative movement between the same and the surface of the washer aperture, and a second utility helical thread formation along a remaining portion of the shank and of a crest diameter at least adjacent the first thread formation slightly greater than the predetermined crest diameter of the first thread formation in interfering relation with the washer body around the aperture therein for trapping the washer on the shank in the region of the first thread formation, the root diameters of the first and second thread formations being substantially equal, the included flank angles of the first thread formation being greater than the included flank angles of the second thread formation wherein the second thread formation provides primary thread engagement with an associated workpiece and contributes to the clamping force capability of the unit while the first thread formation provides a prevailing torque capability to the unit in addition to contributing to the clamping force capability of the unit.

2. A preassembled composite fastener unit as claimed in claim 1, wherein the washer is a conical washer with the first helical thread formation extending to the plane of the under surface thereof at the washer aperture without deformation of the original washer configuration.

3. A preassembled composite fastener unit as claimed in claim 2, wherein at least one and a half pitch turns of the first thread formation extend below the plane of the under surface of the outer edge of the washer when the washer is stressed toward flattening in installation whereby to provide a thread formation for workpiece engagement.

4. The fastener unit as claimed in claim 1, in combination with an apertured workpiece in which threads formed in the workpiece aperture are in full mating with the threads of the second thread formation throughout the extent of mutual interengagement therebetween and wherein the thread flanks of the first thread formation are in interfering prevailing torque association with the workpiece threads.

* * * * *